Jan. 4, 1944.  F. H. ROBY  2,338,540
WELDER CONTROL SYSTEM
Filed June 12, 1941  2 Sheets-Sheet 1
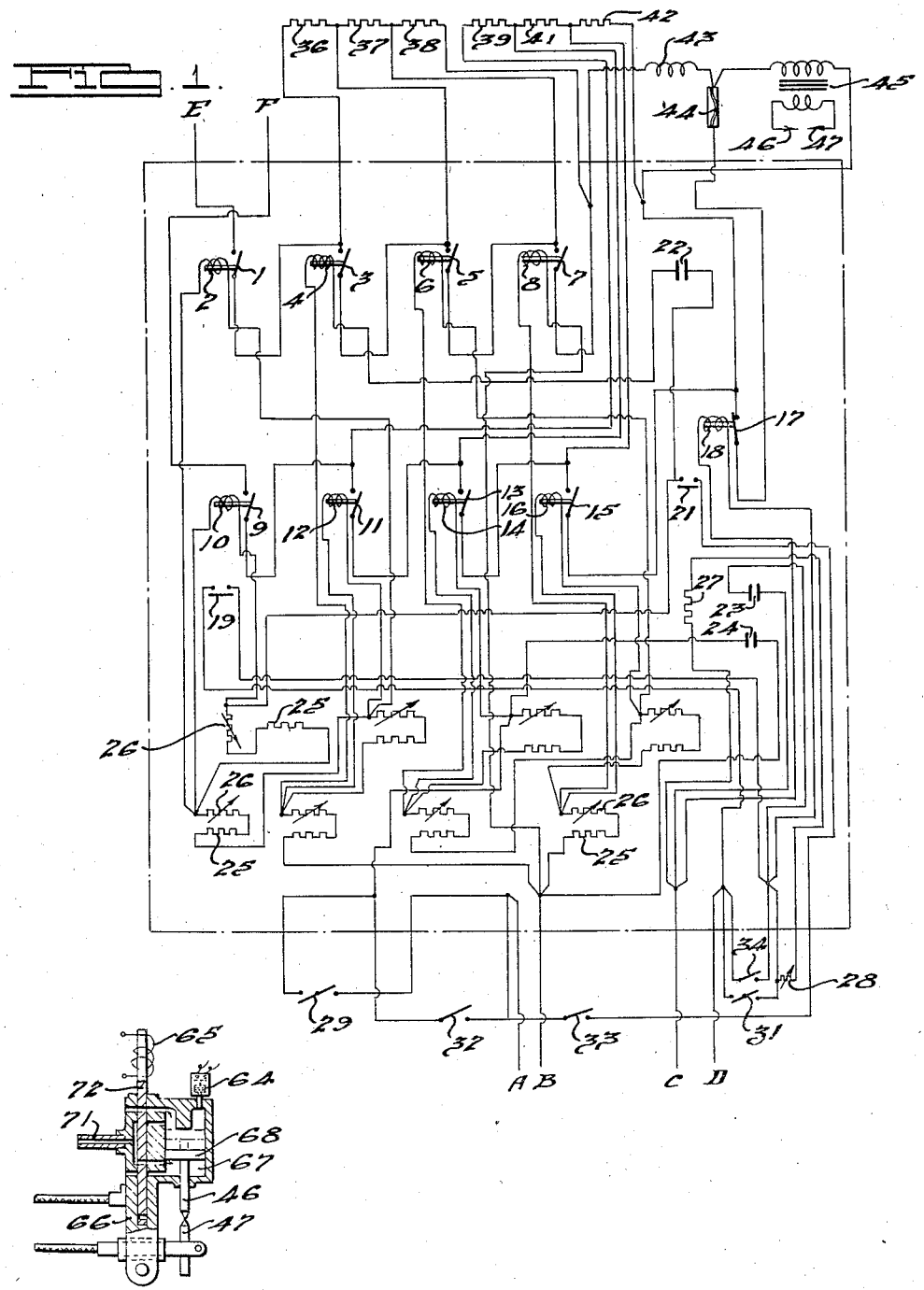
INVENTOR
*Frank H. Roby.*
BY
ATTORNEY Jan. 4, 1944.   F. H. ROBY   2,338,540
WELDER CONTROL SYSTEM
Filed June 12, 1941   2 Sheets-Sheet 2

INVENTOR
Frank H. Roby.
BY
ATTORNEY

Patented Jan. 4, 1944

2,338,540

UNITED STATES PATENT OFFICE 2,338,540

WELDER CONTROL SYSTEM

Frank H. Roby, Milwaukee, Wis., assignor to Square D Company, Detroit, Mich., a corporation of Michigan Application June 12, 1941, Serial No. 397,679

20 Claims. (Cl. 219—4)

This invention relates to an electric welder control system and more particularly to a system for the electric welding of material by the discharge of stored energy.

In the electric welding of thin gauge aluminum and its alloys and certain other materials, it has been found desirable to effect the flow of welding current by the discharge of stored energy. In one system of this type, a three-phase mercury arc rectifier is used to draw power out of a three-phase alternating current system and the direct current output is utilized for storing energy in a special type of welding transformer of high reactance. The charging of the transformer is done with the electrodes of the welding machine closed on the pieces of work. When the primary of the welding transformer is broken, the energy stored therein is dissipated through the secondary winding and the work, thereby making a weld. The unidirectional current wave form of discharge current with its exponential characteristics seems to be a distinct advantage in the working of aluminum and its alloys. Another advantage of this particular system is that the charging current can be used as a "fly wheel" effect to prevent a heavy maximum demand on a single phase alternating current power system.

One object of this invention is to provide improved means for effecting the consistent opening of the charging circuit for the transformer primary after energy has been stored therein to effect the weld.

Another object of the invention is to effect opening of the primary circuit of the energy storing transformer through a plurality of contactors operating in timed sequence to insert resistance into the primary circuit and eventually to effect interruption of the current flowing therethrough.

Another object of the invention is to provide a flexible circuit controlling system for stored energy welding which shall permit the omission of certain of the controlling devices so as to speed up the circuit opening for lighter welding loads.

Another object of the invention is to provide a heat control arrangement for stored energy welding in which the flow of the welding current may be stopped at any point upon its exponential wave form.

Another object of the invention is to provide a control system for stored energy welding which shall prevent the closing of the charging circuit until the heat control circuit generally referred to in the preceding object has been interrupted.

Another object of the invention is an improved and simple welder control system for securing a hold time in the effecting of a stored energy weld.

Other objects and features of the invention will be readily apparent to those skilled in the art from the specification and appended drawings illustrating certain preferred embodiments in which:

Figure 1 is a schematic representation of the internal wiring diagram of the power control panel according to the present invention and with certain exterior elements and connections represented.

Figure 2 is a schematic representation of a welder machine upon which the system according to the present invention may be utilized.

Figure 3:
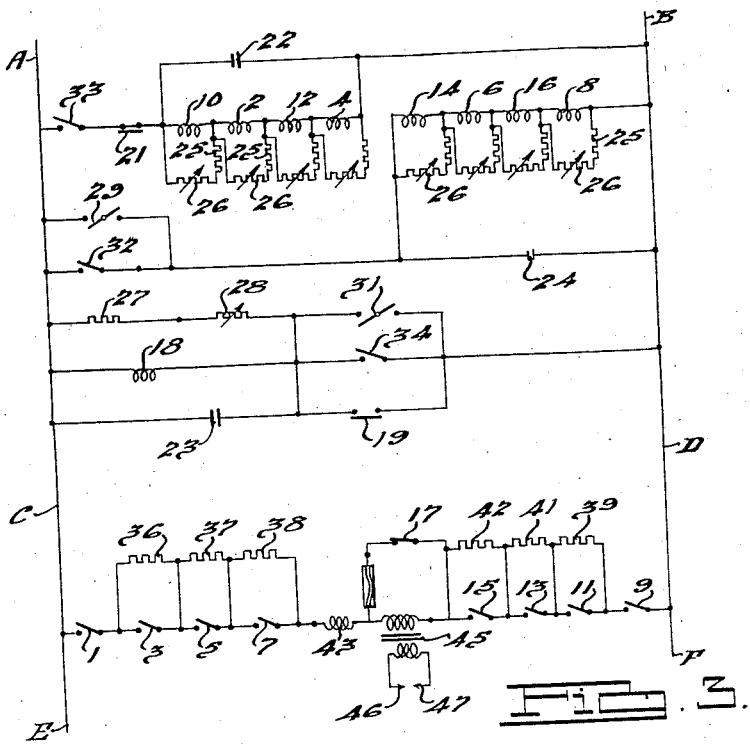
Figure 3 is a simplified wiring diagram of the power controlling portion of the system.

The power control panel of Figure 1 incorporates eight single pole, direct current, electromagnetically operated contactors of the normally open type indicated at 1, 3, 5, 7, 9, 11, 13, and 15, and having operating coils 2, 4, 6, 8, 10, 12, 14, and 16, respectively. An additional but normally closed contactor for the heat control feature is indicated at 17 with an operating coil 18. Contactor 9 is provided with a normally open interlock contact 19 and the contactor 17 is provided with a normally open interlock contact 21. This panel further includes three condensers 22, 23 and 24 connected in the control circuit for a purpose to be hereinafter described. It further includes a plurality of control resistances having a set connected in parallel with each of the operating coils of the contactors, each of these sets including a fixed resistor 25 and an adjustable resistor 26, these resistances for the eight normally open contactors being designated by the same numbers. For the normally closed contactor 17, the coil 18 has in parallel therewith the fixed resistor 27 and an adjustable resistor 28 not on the panel and normally disposed adjacent the welding machine to provide for ready variation of the heat control feature. Exterior to the panel are the wiring connections A, B, C, D, E, and F, shown in the simplified diagram of Figure 3 with points A, C and E connected to one side of the line and the points B, D and F connected to the other side of the line. Also exterior to the panel are manual "on" and "off" switches 29 and 31 and contacts 32, 33 and 34 for a 3-pole normally open electromagnetic relay of standard form whose operating coil is indicated at 35 in the sequence panel wiring diagram of Figure 4. Also shown connected to the elements on the power panel of Figure 1 are the current reducing resistors 36, 37, 38, 39, 41, and 42 which are interposed in the charging circuit before opening thereof. Also shown is the operating coil 43 of a maximum current relay which will be explained hereinafter, a limiting fuse 44, and the welder transformer 45, with the electrodes indicated at 46 and 47.

Figure 4:
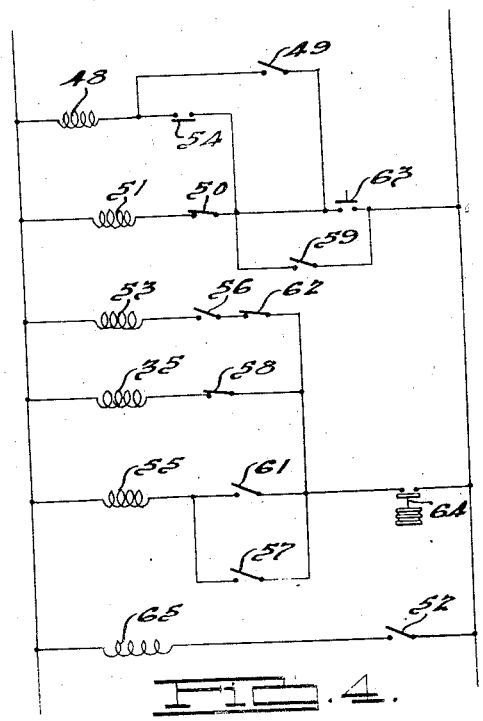
Figure 4 is a schematic wiring diagram of the sequence panel and operational control portion of the system.

Figure 4 shows the schematic wiring diagram of the sequence panel for controlling the operations in the welding cycle. This includes an operating coil 48 for a double throw, single pole relay having normally open contacts 49, and normally closed contacts 50; an operating coil 51 for a double pole, single throw relay having normally open contacts 52 and 59; an operating coil 53 for a time delay relay having normally open contacts 54 whose closing is effected a predetermined time interval after energization of the operating coil 53 in any well known manner; and an operating coil 55 for an electric relay having three sets of contacts, normally open contacts 56 and 57 and normally closed contacts 58.

Also shown are the contacts of the maximum current relay previously referred to as having an operating coil 43. This relay has single pole, double throw contacts with normally open contacts 61 and normally closed contacts 62. Also shown in the wiring diagram of Figure 4 is an operating push button 63, a pressure switch 64 on the welding machine, and the solenoid valve operating coil 65.

The circuits of Figures 1 and 3 are adapted to be connected to the direct current output of the rectifier, while the circuit of Figure 4 can be connected to the alternating current supply if desired, this depending upon the individual characteristics of the control elements in the sequence panel.

The relays and contacts referred to are of standard construction for the various features and functional relationships set forth in the description. The maximum current relay is simply a relay whose operation is effected when a certain predetermined value of current flows therethrough, such relays also being of standard construction.

The schematic diagram of the welder machine of Figure 2 with which the present system will be explained includes a frame 66 having therein a cylinder 67 in which reciprocates a piston 68 carrying a movable electrode 46. In connection with the cylinder 67 is shown a conventional pressure switch 64. A valve is incorporated in the frame to control the application of fluid pressure from an inlet 71 to opposite sides of the piston 68. The valve control is through the valve slider 72 operated by the solenoid coil 65. The parts are shown in the position in which the coil 65 has just been deenergized to permit the slider to move into the lowermost position. The fluid pressure is now in communication with the lower side of the piston which will now move upwardly to separate the electrodes from the work.

To initiate a welding cycle, the work is placed in position and push button 63 actuated. This energizes the operating coil 51 through the normally closed contact 50 and the energization of the coil 51 effects closing of the contacts 52 and 59 operated thereby. The closing of contact 59 forms a holding circuit around the push button 63 so that its opening thereafter will not effect a cessation of the cycle. The closing of contact 52 energizes the solenoid valve operating coil 65 to raise the valve control slider 72 and place the upper side of the piston 68 in communication with the source of fluid pressure. The movable electrode then moves downwardly to clamp the work between the electrodes 46 and 47 and when a sufficient pressure has been placed upon the work, pressure switch 64 operates to effect closing of its contacts. This energizes the operating coil 35 through the normally closed contact 58 and energization of coil 35 effects closing of its operating contacts 32, 33 and 34 in the power control circuit. The closing of contact 34 effects energization of the operating coil 18 of contactor 17 to effect opening of its normally closed contact. The closing of contact 32 effects energization of the serially connected operating coils 14, 6, 16, and 8 of contactors 13, 5, 15, and 7. The closing of contact 33 will set up the circuit for energizing the serially connected operating coils 10, 2, 12, and 4 of contactors 9, 1, 11, and 3. However, the energization of these last mentioned operating coils is not complete until the closing of the normally open interlock contact 21 on contactor 17, this interconnection ensuring that the primary of the welding transformer cannot be connected to the charging circuit until the normally closed contact of the contactor 17 has been opened. With the contactors 1, 3, 5, 7, 9, 11, 13, and 15 closed, the primary of transformer 45 is now connected to the direct current charging circuit and current will flow to store energy within the transformer.

As energy is stored, the current flowing through the transformer primary will increase. At a certain current value corresponding to a desired amount of energy stored within the transformer, the maximum current relay operating coil 43 will sufficiently energize the relay to effect operation thereof, and the opening of its contact 62 and the closing of its contact 61. The closing of contact 61 energizes the operating coil 55 through the closed contacts of pressure switch 64. The energization of coil 55 effects operation of its contacts to open contact 58 and close contact 57, the closing of contact 57 forming a holding circuit for the operating coil 55 about the normally open contact 61 of the maximum current relay. The opening of contact 58 deenergizes the operating coil 35 and its deenergization effects opening of its contacts 32, 33 and 34. The opening of contacts 32 and 33 will immediately disconnect the operating coils 10, 2, 12, 4, 14, 6, 16, and 8 from the circuit. To ensure that the connection is immediately interrupted, condenser 22 is connected in parallel with the serially connected operating coils 12, 2, 10, and 4, and condenser 24 is connected in parallel with the serially operated coils 14, 6, 16 and 8.

In parallel with each of the operating coils 10, 2, 12, 4, 14, 6, 16, and 8 is connected a set of resistors constituted by fixed resistors 25 and the adjustable resistors 26. This parallel circuit for the operating coils delays the decay of flux in the magnet circuits of the contactors for a period of time determined by the value of the resistance in the parallel circuit. The fixed resistances 25 may be selected of different values to provide a minimum time displacement in the opening of the respective contactors in each series, or these fixed resistors may be of the same value with all time adjustments provided in the adjustable resistances 26. However these values are selected, adjustment is finally made to provide for opening of the contactors in sequence in each series on each side of the line. The sequence, as shown in Figures 2 and 3, in the series at the left hand side of the transformer in Figure 3, would be the successive timed opening of contactors 7, 5, 3, and 1 in that order. Similarly the series to the right of the transformer in Figure 3 would open in the timed sequence 15, 13, 11, and 9. The successive openings of these contactors interposes in the charging circuit the resistances 38—42, 37—41, and 36—39 in that order and finally effects the direct disconnection of the circuit at the two contactors 1 and 9. This insertion of steps of resistance and the final interruption of the circuit is carried out very rapidly as it is desired to open the charging circuit in a minimum of time. In view of the direct current circuit, it is not feasible to directly interrupt the circuit in view of the possible hanging on of the arc or of the large size of the equipment which would be required, and with this system the charging circuit is definitely interrupted and within a period of time inhibiting substantial loss of stored energy and permitting the effecting of a satisfactory weld but without the necessity for the interrupting capacity which would otherwise be required.

With the charging circuit interrupted, the energy stored in the transformer 35 is now dissipated through the secondary winding and through the work to effect a weld. This current will be unidirectional and will have a substantially exponential wave form. The flow of this current may be controlled to provide for the control of the heat supplied to the weld. This control is optionally placed in effect by the manually operated switch 31. With the switch 31 closed, the operating coil 18 of contactor 17 remains directly energized so long as there is power supplied from the rectifier. With the manual switch 31 in the "off" position, the energization of the operating coil 18 is under the control of the contact 34 and the interlock contact 19 on contactor 9. When the coil 35 is deenergized to effect opening of contacts 32, 33, and 34 and the charging circuit control contactors are open, the opening of contact 34 and the opening of the interlock contact 19 will effect deenergization of the operating coil 18 of the contactor 17. Two parallel circuits are provided for this operating coil, the one including condenser 23 to ensure immediate interruption of the energizing circuit and the other including the fixed resistor 27 and the adjustable resistor 28 to determine the time delay between the opening of the circuit and deenergization of the contactor, the resistance again functioning to delay the decay of flux in the magnet circuit so that the closing of the normally closed contact of the contactor 17 will be effected a predetermined time interval after the energizing circuit thereto is interrupted. When the normally closed contact of contactor 17 closes, a short circuit is provided for the primary of the transformer and the remaining stored energy is then dissipated therethrough so that current ceases to flow in the transformer secondary and through the work. Accordingly, adjustment of the resistor 28 will provide for control of the heat supplied to the weld, since it will determine the length of time in which the secondary current flows. Thus, when the manual switch 31 is closed, all the energy stored in the transformer will be transmitted through the weld, while with this switch open adjustment of the resistor 28 will permit any desired proportion of stored energy to be transmitted by selecting the point on the exponential wave form at which current flow is stopped. The interlock contact 19 ensures that the normally closed contact of contactor 17 will not be closed until the charging circuit is interrupted.

With the interruption of the charging circuit, the maximum current relay returns to its normal position, thus closing contact 62 and opening contact 61, the opening of contact 61 having no effect in view of the holding circuit through contact 57. The closing of contact 62 energizes the operating coil 53 through the now closed contact 56. Coil 53 controls the operation of the time delay relay and a predetermined time interval after its deenergization effects closing of contact 54. This period of time between the energization of coil 53 and the closing of contact 54 determines the weld and hold time in the welding cycle, in which pressure is maintained on the electrodes after current ceases to flow through the work for a set period, and it is seen that this period is initiated through the action of the maximum current relay which controls the energy transmitted through the transformer. The closing of contact 54 effects energization of the operating coil 48 through the closed contact 59. The energization of coil 48 effects closing of its contact 49 and opening of its contact 50. The closing of contact 49 provides a circuit for coil 48 so that it will remain energized if the push button 63 is maintained depressed so that only a single weld can be produced regardless of the length of time the push button 63 is maintained. Opening of contact 50 deenergizes operating coil 51 to thus effect opening of its contacts 59 and 52. Opening of contact 52 deenergizes the solenoid valve operating coil 65 to release the pressure on the electrode. This permits opening of the pressure switch 64 and deenergization of the entire sequence panel with the exception that the coil 48 will remain energized to maintain its contact 50 open so long as push button 63 is maintained depressed, and, hence, will prevent the carrying out of a second welding cycle until push button 63 has been released and again closed.

Another optional feature of the system is provided by the manual switch 29. With this switch open, the sequence of portions previously described is carried out. With this switch closed, the operating coils 14, 6, 16 and 8 are maintained energized at all times that power is supplied from the rectifier, and, hence, contactors 13, 5, 15 and 7 are maintained closed. This means that opening of the charging circuit when sufficient energy has been stored in the transformer will be effected through contactors 1, 3, 11 and 9 only, which means that only resistors 36 and 39 will be inserted in the circuit prior to the disconnecting of the circuit at contactors 1 and 9. This optional arrangement may be utilized with lighter power loads in order to speed up the circuit opening operation.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A welder control system for electrically welding work by the discharge of unidirectional stored electrical energy therethrough between electrodes pressed thereagainst, which comprises energy storing means, a direct current source for supplying energy to said energy storing means, a plurality of serially connected, individually operating contactors for connecting said source to said energy storing means, and means for opening said contactors in timed sequence to open the circuit at a plurality of points so that arcing at the contactors will result in a plurality of arcs in series to aid in interrupting the charging current.

2. A welder control system for electrically welding work by the discharge of unidirectional stored electrical energy therethrough between electrodes pressed thereagainst, which comprises energy storing means, a direct current source for supplying energy to said energy storing means, a plurality of serially connected, individually operating contactors for connecting said source to said energy storing means, means for opening said contactors in timed sequence to open the circuit at a plurality of points so that arcing at the contactors will result in a plurality of arcs in series to aid in interrupting the charging current, and means connecting said energy storing means, so that upon the cessation of charging current, it will discharge said stored energy in the form of a unidirectional current of substantially exponential wave form through the work to effect a weld.

3. A welder control system for electrically welding work by the discharge of unidirectional stored electrical energy therethrough between electrodes pressed thereagainst, which comprises energy storing means, a direct current source for charging energy into said energy storing means, a plurality of serially connected, individually operating contactors for connecting said source to said energy storing means, resistance elements in parallel with certain of said contactors, means for opening said contactors in timed sequence to successively insert resistance in the charging circuit, at least one contactor being connected to finally directly open the circuit, said timed sequence being a relatively short interval so as to effect interruption of the charging current in as short a period as is consistent with positive circuit interruption.

4. A welder control system for electrically welding work by the discharge of unidirectional stored electrical energy therethrough between electrodes pressed thereagainst, which comprises energy storing means, a direct current source for charging energy into said energy storing means, a plurality of serially connected, individually operating contactors for connecting said source to said energy storing means, resistance elements in parallel with certain of said contactors, means for opening said contactors in timed sequence to successively insert resistance in the charging circuit, at least one contactor being connected to finally directly open the circuit, said timed sequence being a relatively short interval so as to inhibit substantial dissipation of the stored energy.

5. A welder control system for electrically welding work by the discharge of unidirectional stored electrical energy therethrough between electrodes pressed thereagainst, which comprises a relatively high reactance welding transformer having its secondary winding adapted to be connected to the welding electrodes, a direct current source adapted to be connected to the primary winding of the transformer to supply energy thereto, a plurality of serially connected, individually operating contactors for connecting said source to said transformer primary, resistance elements in parallel with certain of said contactors, means for initiating the opening of said contactors when a predetermined energy has been stored in said transformer, and means for effecting opening of said contactors in timed sequence to successively insert resistance in the charging circuit, at least one contactor being connected to finally directly open the circuit.

6. A welder control system for electrically welding work by the discharge of unidirectional stored electrical energy therethrough between electrodes pressed thereagainst, which comprises a relatively high reactance welding transformer having its secondary winding adapted to be connected to the welding electrodes, a direct current source adapted to be connected to the primary winding of the transformer to supply energy thereto, a plurality of serially connected, individually operating contactors for connecting said source to said transformer primary, resistance elements in parallel with certain of said contactors, means for initiating the opening of said contactors when a predetermined energy has been stored in said transformer, and means for effecting opening of said contactors in timed sequence to successively insert resistance in the charging circuit, at least one contactor being connected to finally directly open the circuit, the energy stored within said transformer being dissipated through the secondary winding to effect a weld when the charging current is interrupted.

7. A welder control system for electrically welding work by the discharge of unidirectional stored electrical energy therethrough between electrodes pressed thereagainst, which comprises energy storing means, a direct current source for supplying energy to said energy storing means, a plurality of serially connected, individually operating contactors for connecting said source to said energy storing means, operating coils for said contactors, a parallel circuit for each of said operating coils, said parallel circuits including resistance and operating to delay the decay of flux in the magnetic circuits of the contactors, means for deenergizing said contactor operating coils when sufficient energy has been stored in the energy storing means, the resistance of said parallel circuits being selected to effect opening of said contactors in timed sequency to effect a plurality of successively opened points in the circuit.

8. A welder control system for electrically welding work by the discharge of unidirectional stored electrical energy therethrough between electrodes pressed thereagainst, which comprises energy storing means, a direct current source for supplying energy to said energy storing means, a plurality of serially connected, individually operating contactors for connecting said source to said energy storing means, resistance elements in parallel with certain of said contactors, an operating coil for each of said contactors, a parallel circuit around each of said operating coils, said parallel circuits including resistance and being adapted to delay the decay of flux in the magnetic circuits of the contactors, means for deenergizing said operating coils when sufficient energy has been stored in the energy storing means, said coil parallelling resistances being of different values to have different delaying effects so as to cause opening of the contactors in timed sequence to successively insert resistance in the charging circuit, at least one contactor being connected to finally directly open the circuit, said timed sequence being a relatively short interval so as to inhibit substantial dissipation of the energy stored.

9. A welder control system for electrically welding work by the discharge of unidirectional stored electrical energy therethrough between electrodes pressed thereagainst, which comprises a relatively high reactance welding transformer having a secondary winding adapted to be connected to the electrodes, a direct current source adapted to be connected to the transformer primary to supply energy thereto, a plurality of serially connected, individually operating contactors for connecting said source to said transformer primary, resistance elements in parallel with certain of said contactors, an operating coil for each of said contactors, a parallel circuit about each of said operating coils containing resistance and adapted to delay the decay of flux in the magnetic circuits of the contactors, capacity means connected in parallel with said operating coils to ensure quick interruption of the energizing circuit thereto, means for interrupting the energizing circuit to the operating coils of the contactors when a sufficient energy has been stored in the welding transformer, the resistance in the circuits parallel to the operating coils of the contactors being selected to effect opening of the contactors in timed sequence to successively insert said resistance elements in the charging circuit, at least one contactor being connected to finally directly open the charging circuit without the parallel inclusion of resistance.

10. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary of the transformer to charge energy thereinto, a plurality of serially connected, individually operating contactors for connecting said source to said transformer primary, resistance elements in parallel with certain of said contactors, individually operating coils for said contactors connected in series to a common energizing circuit, individual circuits parallelling each of said operating coils and containing resistance and adapted to delay the decay of flux in the magnetic circuits of the contactors, a condenser connected in parallel with the serially connected operating coils so as to ensure quick breaking of the energizing current thereto, means for opening said contactor coil energizing circuit when sufficient energy has been stored in the transformer, the resistance of said operating coil parallel circuits being selected to effect opening of the contactors in timed sequence to successively insert said resistance elements in the charging circuit, at least one contactor being connected to finally directly open the circuit, the energy stored in the transformer being dissipated through the secondary winding to effect a weld when the charging circuit is interrupted.

11. A welder control system for electrically welding work by the discharge of unidirectional stored energy therethrough between electrodes pressed thereagainst, which comprises energy storing means, a direct current source for supplying energy to said energy storing means, a plurality of serially connected, individually operating contactors for connecting said source to said energy storing means, resistance elements in parallel with certain of said contactors, means for opening said contactors in timed sequence to successively insert resistance in the circuit, at least one contactor being connected to finally directly open the charging circuit, and means for optionally maintaining certain of said resistance parallelled contactors closed throughout the cycle in order to speed up the charging circuit interrupting operation when the load is sufficiently light to be effectively interrupted without the insertion of the resistance elements associated with the contactors maintained closed.

12. A welder control system for electrically welding work by the discharge of unidirectional stored energy therethrough between electrodes pressed thereagainst, which comprises energy storing means, a direct current source for supplying energy to said energy storing means, a plurality of serially connected, individually operating contactors in each leg of the circuit between said source and said energy storing means, resistance elements in parallel with certain of said contactors in each leg, means for deenergizing said contactors when sufficient energy has been stored in the energy storing means, means for effecting opening of the contactors in each leg in timed sequence to successively insert said resistance elements in the charging circuit, at least one contactor in each leg being connected to finally directly open the charging circuit without a parallelling resistance element, and means for optionally maintaining certain contactors in each leg closed throughout the welding cycle so as to speed up interruption of the charging current where the load may be effectively interrupted without the insertion of the resistance elements associated with the contactors maintained closed.

13. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, means for connecting and disconnecting said source to said transfomer primary, energy stored in the transformer being dissipated through the secondary winding to effect a weld when the charging circuit is interrupted after a charging interval, a parallel circuit about the primary winding of the transformer, and means for effecting closing of said parallel circuit to short circuit the primary winding a predetermined time interval after the charging circuit has been interrupted and flow of welding current initiated, the short-circuiting of the primary winding by the parallel circuit causing dissipation of the remaining stored energy therethrough and cessation of the welding current flowing in the transformer secondary.

14. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, means for connecting and disconnecting said source to said transformer primary, energy stored in the transformer being dissipated through the secondary winding to effect a weld when the charging circuit is interrupted after a charging interval, a parallel circuit about the primary winding of the transformer, means for effecting closing of said parallel circuit to short circuit the primary winding a predetermined time interval after the charging circuit has been interrupted and flow of welding current initiated, short-circuiting of the primary winding by the parallel circuit causing dissipation of the remaining stored energy therethrough and cessation of the welding current flowing in the transformer secondary, and means for optionally maintaining said transformer primary parallel circuit open throughout the welding cycle so that the entire stored energy will be dissipated through the weld.

15. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, means for connecting and disconnecting said source to said transformer primary, energy stored in the transformer being dissipated through the secondary winding to effect a weld when the charging circuit is interrupted after a charging interval, a parallel circuit about the primary winding of the transformer, and means for effecting closing of said parallel circuit to short circuit the primary winding a predetermined time interval after the charging circuit has been interrupted and flow of welding current initiated, the short-circuiting of the primary winding by the parallel circuit causing dissipation of the remaining stored energy therethrough and cessation of the welding current flowing in the transformer secondary, and means for adjusting said timing interval so as to effect cessation of welding current flow at any point on its wave form which may be desired.

16. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, means for connecting and disconnecting said source to said transformer primary, energy stored in the transformer being dissipated through the secondary winding to effect a weld when the charging circuit is interrupted after a charging interval, a parallel circuit about the primary winding of the transformer, means for effecting closing of said parallel circuit to short circuit the primary winding a predetermined time interval after the charging circuit has been interrupted and flow of welding current initiated, the short-circuiting of the primary winding by the parallel circuit causing dissipation of the remaining stored energy therethrough and cessation of the welding current flowing in the transformer secondary, means preventing closing of said transformer primary parallel circuit while the charging circuit remains closed, and means for preventing closing of the charging circuit if and while the parallel circuit is closed.

17. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, at least one normally open contactor controlling the connection and disconnection of the charging circuit to the transformer primary, a parallel circuit about the transformer primary, a normally closed contactor controlling the closing and opening of said parallel circuit, said normally closed contactor being energized to open the parallel circuit while the normally open contactor is energized to connect the source to the transformer primary to charge energy thereinto, means deenergizing said normally open contactor to effect opening of the charging circuit and dissipation of the stored energy through the transformer secondary winding to effect a weld, and means for deenergizing said normally closed contactor a predetermined time interval after opening of the charging circuit, the short circuit of the transformer primary effected by the closing of the parallel circuit causing dissipation of the remaining energy therethrough and cessation of the flow of welding current.

18. A welder control system for electrically welding work by the discharge of unidirectional stored electrical energy therethrough between electrodes pressed thereagainst, which comprises a relatively high reactance welding transformer adapted to have its secondary winding connected to the welding electrode, a direct current source adapted to be connected to the primary winding of the transformer to charge energy thereinto, at least one normally open contactor controlling the connecton and disconnection of the charging circuit to the transformer primary, a parallel circuit about the transformer primary, a normally closed contactor controlling the closing and opening of said parallel circuit, said normally closed contactor being energized to open the parallel circuit, while the normally open contactor is energized to connect the source to the transformer primary to charge energy thereinto, means deenergizing said normally open contactor to effect opening of the charging circuit and dissipation of the stored energy through the transformer secondary winding to effect a weld, and means for deenergizing said normally closed contactor a predetermined time interval after opening of the charging circuit, the short-circuiting of the transformer primary effected by the closing of the parallel circuit causing dissipation of the remaining energy therethrough and cessation of the flow of welding current, means preventing the energization of the normally open contactor unless and until the normally closed contactor is open, and means preventing deenergization of the normally closed contactor unless and until the normally open contactor is open.

19. A welder control system for electrically welding work by the discharge of unidirectional stored energy stored therethrough between electrodes pressed thereagainst, which comprises a relatively high reactance welding transformer adapted to have its secondary winding connected to the welding electrodes, a direct current source adapted to be connected to the primary winding of the transformer to charge energy thereinto, means for initiating electrode pressure upon the work, means for connecting said source to said transformer primary, control means operating when a predetermined energy has been stored in said transformer to effect operation of said connecting means to open the circuit between the source and said transformer primary, the interruption of said circuit effecting dissipation of the stored energy through the weld, and means for effecting release of electrode pressure a predetermined time interval after operation of said control means, whereby a period is provided for current flow and the maintenance of electrode pressure thereafter to provide a "hold" period in the welding cycle.

20. A welder control system for electrically welding work by the discharge of unidirectional stored electrical energy therethrough between electrodes pressed thereagainst, which comprises a relatively high reactance welding transformer adapted to have its secondary winding connected to the welding electrodes, a direct current source adapted to be connected to a primary winding of the transformer to charge energy thereinto, means for initiating electrode pressure upon the work, means for connecting said source to said transformer primary, control means operating when a predetermined energy has been stored in said transformer to effect operation of said connecting means to open the circuit between the source and said transformer primary, the interruption of said circuit effecting dissipation of the stored energy through the weld, timing means energized in response to the operation of said control means, said timing means operating to effect release of electrode pressure after a predetermined time interval whereby a timing period for current flow and maintenance of electrode pressure thereafter to provide a "hold" period in the welding cycle is provided for.

FRANK H. ROBY.